Figure 1:
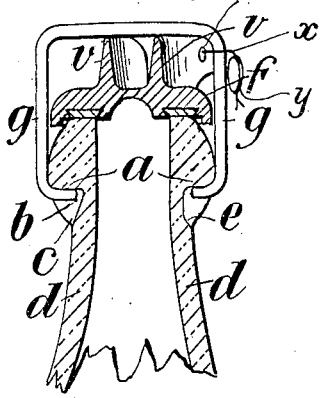

H. MARLES.
BOTTLE OR OTHER RECEPTACLE AND STOPPER OR COVER FOR SUCH RECEPTACLES.
APPLICATION FILED AUG. 12, 1907.

904,705.

Patented Nov. 24, 1908.

2 SHEETS—SHEET 1.

Witnesses.
Jesse N. Lutton
R. V. Sommers

Inventor.
Henry Marles
by Henry Orth
atty.

H. MARLES.
BOTTLE OR OTHER RECEPTACLE AND STOPPER OR COVER FOR SUCH RECEPTACLES.
APPLICATION FILED AUG. 12, 1907.

904,705.

Patented Nov. 24, 1908.

2 SHEETS—SHEET 2.

Witnesses.

Inventor.
Henry Marles

UNITED STATES PATENT OFFICE.

HENRY MARLES, OF MANOR PARK, ENGLAND.

BOTTLE OR OTHER RECEPTACLE AND STOPPER OR COVER FOR SUCH RECEPTACLES.

No. 904,705.  Specification of Letters Patent.  Patented Nov. 24, 1908.

Application filed August 12, 1907. Serial No. 388,250.

*To all whom it may concern:*

Be it known that I, HENRY MARLES, a subject of the King of Great Britain, residing at 24 Essex road, Manor Park, in the county of Essex, England, engineer, have invented new and useful Improvements in and Connected with Bottles or other Receptacles and in Stoppers or Covers for Such Receptacles, of which the following is a specification.

This invention relates to improvements in and connected with bottles or other receptacles and in stoppers or covers for such receptacles of the type in which the neck or the like of the bottle or other receptacle is provided with a wire loop or bail and the stopper cap or cover (provided with inclined planes adapted to operate in conjunction with the bail) is so constructed that, when attached to the bottle by the said bail, it cannot be lost or become detached under ordinary usage. The bails for closures of this kind have heretofore been generally provided with inwardly turned ends adapted to take into recesses or grooves in or under a shoulder on the bottle neck or they have been connected to a band or wire wholly or partly encircling the neck of the bottle or other receptacle.

Now according to this invention the neck or the like of a bottle or other receptacle is provided with recesses adapted to take the ends of the bail the said recesses being so formed that their sides or walls present the necessary amount of bearing surface at their upper ends or parts to take the pull of the stopper and bail, but that the height of the said walls is reduced or may even merge into the outer surface of the bottle neck or the like at a part or parts where no strain comes when the stopper is in use the object being to allow of the bail being inserted into and removed from its recesses without unduly straining it in such a manner as to deform it when putting the bail in or if for any reason it is necessary or advisable to remove the bail and with it the stopper or cap.

The invention also consists in so constructing such a bottle or other receptacle, that means are provided for preventing the stopper from falling down and getting in the way when pouring or when cleaning or draining the bottle.

A further improvement consists in so constructing the stopper or cap that a packing ring may be employed instead of a disk and a minor improvement consists in providing a hole in one or both of the inclines or cam surfaces through which hole and round the bail a cord or wire may be fastened and sealed if desired to prevent the contents from being tampered with.

Figure 2:
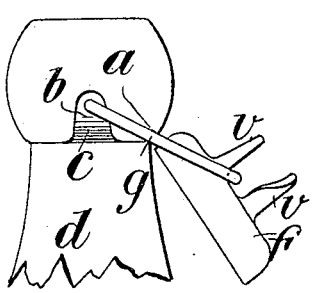
Figure 4:
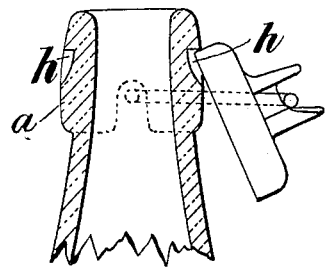
Figure 3:
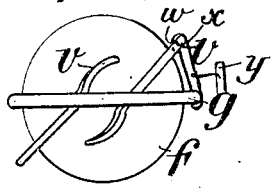
Figure 5:
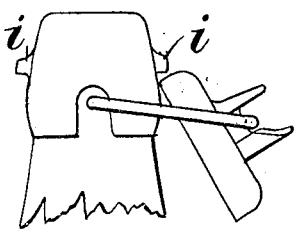
Figure 6:
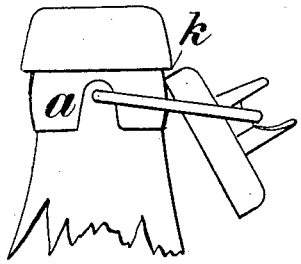
Figure 7:
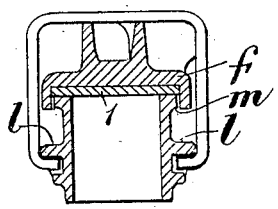
Figure 8:
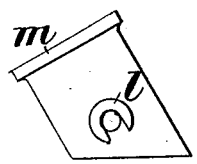
Figure 9:
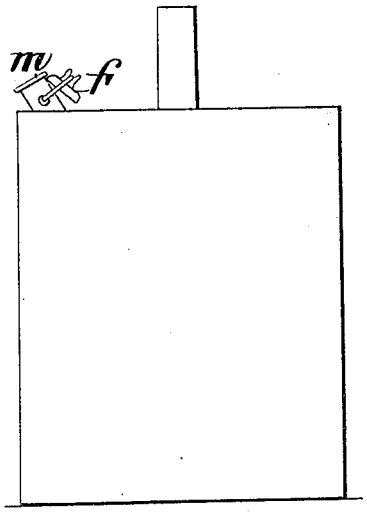
Figure 10:
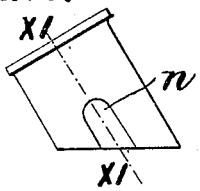
Figure 11:
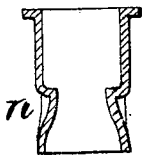
Figure 12:
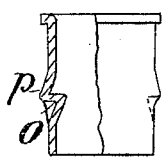
Figure 13:
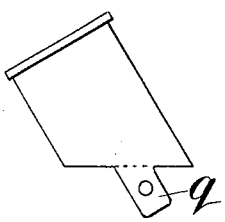
Figure 14:
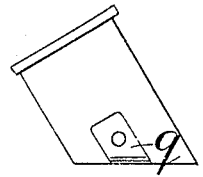
Figure 15:
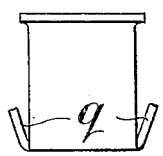
Figure 16:
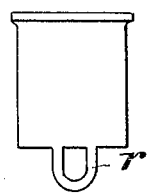
Figure 17:
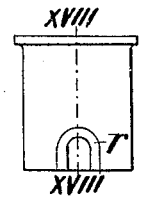
Figure 18:
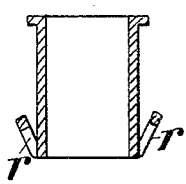
Figure 19:
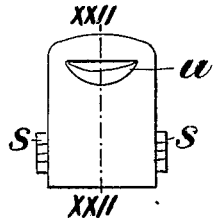
Figure 20:
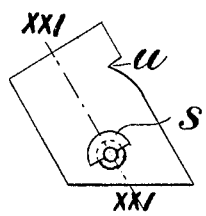
Figure 21:
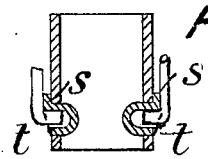
Figure 22:
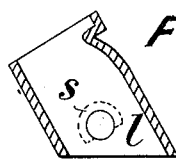
Figure 23:
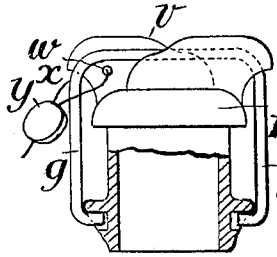
Figure 24:
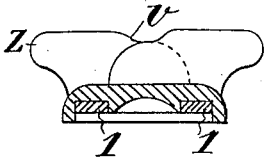
Figure 25:
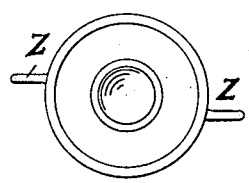

Figure 1 of the accompanying drawings illustrates in sectional elevation part of a glass bottle provided with a closure constructed according to this invention. Fig. 2 is a side view thereof with the seal removed and the stopper off the mouth of the bottle. Fig. 3 is a plan of the stopper and bail. Fig. 4 is a sectional elevation of a modification. Fig. 5 is a similar view of another modification. Fig. 6 is a similar view of yet another modified form of glass bottle. Fig. 7 is a sectional elevation of a neck of a metal receptacle. Fig. 8 is a side view thereof and Fig. 9 shows the neck applied to the receptacle but drawn to a reduced scale. Fig. 10 is a side view of another neck made of pressed or stamped metal and Fig. 11 is a section on the line XI—XI Fig. 10. Fig. 12 is a view of a modified form of pressed or stamped metal neck partly in section and partly in elevation. Figs. 13 and 14 represent in side elevation in process of manufacture and when manufactured respectively another neck made of stamped metal and Fig. 15 is a front elevation of the same. Figs. 16 and 17 show in side elevation during and after manufacture respectively a slightly modified construction and Fig. 18 is a sectional elevation on the line XVIII—XVIII Fig. 17. Fig. 19 is a front elevation of another modification. Fig. 20 is a side view and Fig. 21 is a sectional elevation thereof on the lines XXI—XXI Fig. 20. Fig. 22 is a section on the line XXII—XXII Fig. 19. Fig. 23 is a part sectional elevation of a bottle neck with means for facilitating the sealing of the closure. Figs. 24 and 25 are respectively sectional elevation and inverted plan of a stopper or cover.

In the case of a glass bottle and as shown for instance in Figs. 1, 2 and 3 the neck is or may be provided as usual with a so-called ring $a$ near the mouth thereof and two recesses $b$ to receive the in-turned ends of the bail $g$ are made near the lower end or edge of the said ring said recesses being deepest at their upper parts and shallower below so that the lowest part of the recess approximately merges at $c$ as shown on the left hand side of Fig. 1 into the neck $d$ of the bottle where the ring or shoulder merges into the neck or the bottom surfaces of the two recesses may be parallel and there may be a short step up at $e$ as shown on the right hand side of Fig. 1 from the lower end of the recess to the outer surface of the bottle neck and in order that the stopper $f$ may not fall down when pouring out the contents of the bottle the stopper or cap and the bail $g$ are so proportioned that the edge of the said stopper may drop or take against the shoulder formed by the ring $a$ of the bottle as shown in Fig. 2, or as shown in Fig. 4 against a shoulder formed by a small recess $h$ or against a shoulder formed by a stop $i$ as shown in Fig. 5 or against a shoulder or bead $k$ formed in or on the neck of the ring $a$ as shown in Fig. 6.

In applying the invention to the neck of a metal receptacle and particularly where the said neck is made of cast metal as shown in Figs. 7, 8 and 9 the walls of the recesses for the ends of the bail are suitably formed of fillets $l$ on the neck the lower sides of which fillets project only slightly beyond the surface of the neck, while the upper sides thereof are of such dimensions as to afford the necessary bearing surface for the ends of the bail. These fillets may be circular in shape or of a horseshoe shape or otherwise fashioned so long as they permit of the easy introduction or removal or both of the ends of the bail at a place where there is no strain when the bottle or the like is being stoppered. Such a neck is suitably provided with an annular flange $m$ at the top to form a joint with the stopper $f$ and the said flange also serves to hold the stopper in place when off the mouth of the bottle and when pouring and so on or there may be a lug or recess on to or into which the cap or stopper may take as aforesaid. Or as shown in Fig. 7 the in-turned ends of the bail may be of such a length as not to touch the bottom of the recesses when the stopper is in position as shown but the bail is so bent that the said ends tend to approach each other and do so when the bail is turned back and it grips the inclined surfaces of the projections or fillets $l$ so that the stopper cannot fall down or over the mouth of the bottle unless some little force is employed.

In applying the invention to a neck made of pressed or stamped metal the recesses for the bail are formed by stamping either from the outside as shown at $n$ in Figs. 10 and 11 or it may be from the inside or as shown in Fig. 12 partly from the outside and partly from the inside to form a recess $o$ so that a portion of the metal projects beyond the outer surface of the neck as shown at $p$. Or as shown in Fig. 13 lugs such as $q$ may be provided which are bent up as shown in Figs. 14 and 15 to form the projections or recesses.

In Figs. 16, 17 and 18, the construction is similar except that the lugs $r$ when bent into position practically form horseshoe shaped fillets. Or as shown in Figs. 19 to 22 the said recesses may be made in separate pieces somewhat in the nature of a flanged cap or thimble $s$ the lower part of the flange being removed at $t$ Fig. 20 to allow of the easy introduction and removal of the end of the bail and in all cases it is preferable as aforesaid to make provision for holding the stopper or cap so that it cannot fall down when pouring. In this particular construction the neck is provided with a recess $u$ but if a flange be used, the recess may be dispensed with. This arrangement is also useful when the bottles are being cleaned or drained as it prevents the stopper from getting in the way.

The stopper or cap $f$ is in known manner provided with two oppositely directed parallel inclines or cam surfaces $v$ which are continued to form wings by which the stopper may be grasped when stoppering or unstoppering see for instance Figs. 1, 3 and 23 the space between the two said surfaces allowing of the entrance of the bail when the bottle is opened and when the latter is closed the closure may be sealed by providing one of the wings of the inclines or cams $v$ with a hole $w$ through which a wire or cord $x$ is passed and round the bail $g$ to hold the stopper in the closed position, a seal $y$ being applied to the ends of the wire or cord in the known manner. The inclines $v$ may if desired be provided with wings $z$ such as shown in Figs. 24 and 25 to allow extra leverage in closing or opening the bottle and a further improvement in connection with these stoppers consists in providing the cap with an internal annular space as shown in Figs. 1 and 23, into which space is inserted a ring 1 of leather, cork or other suitable packing material instead of as heretofore employing a disk of packing material which ring is more economical and is more securely retained in position than a disk. Packings of this description are also applicable to stoppers of other constructions and although the annular recess is shown with parallel sides in Fig. 24 it is evident that the latter may be somewhat inclined so as to form a groove of a more or less dovetail section as shown in Fig. 1. Finally it should be clearly understood that although the invention is described with reference to bottles and similar receptacles with a constricted part or neck, the invention is equally applicable to jars or the like.

What I claim as my invention and desire to secure by Letters Patent is:—

1. The combination with a stopper and a bail having in-turned ends, of a receptacle having recesses perpendicular to the direction of pull of said bail for the reception of said ends, said recesses being deepest at the ends adjacent to the orifice of said receptacle and shallower at the other ends.

2. The combination with a stopper having cam surfaces and a bail having in-turned ends, of a receptacle having recesses perpendicular to the direction of pull of said bail for the reception of said ends, the walls of said recesses being deepest at the ends of said recesses where the in-turned ends of the bail bear and shallower at the other ends.

3. The combination with a stopper having cam surfaces and a bail having in-turned ends, of a receptacle having recesses perpendicular to the direction of pull of said bail for the reception of said ends, the walls of said recesses being deepest at the ends nearer to the orifice of said receptacle, and shallower at the other ends, and the bail being so bent and set and the in-turned ends of such a length that, when the stopper is in the closed position, said ends will not touch the bottom of said recesses, but when the stopper is turned back to the open position, said bail will grip the shallower ends of said walls.

4. The combination with a stopper having cam surfaces, a bail having in-turned ends and a receptacle having recesses perpendicular to the direction of pull of said bail for the reception of said ends, said recesses being deepest at the ends adjacent to the orifice of said receptacle and shallower at the other ends, of a shoulder upon the receptacle against which the edge of the said stopper takes when the bottle is tilted.

5. The combination of a stopper having cam surfaces, a bail having in-turned ends, a receptacle having recesses perpendicular to the direction of pull of said bail for the reception of said ends, said recesses being deepest at the ends nearer to the orifice of said receptacle and shallower at the other ends, and an annular shoulder upon the receptacle against which the edge of said stopper takes when the receptacle is tilted.

6. The combination with a stopper having cam surfaces forming wings on the top thereof, a bail provided with in-turned ends and adapted to take between said wings and to ride up on said cam surfaces, and a flexible sealing member adapted to be passed through a hole in one of said wings and round said bail for the purpose of sealing said stopper, of a receptacle having recesses perpendicular to the direction of pull of said bail for the reception of said ends, said recesses being deepest at the ends adjacent to the orifice of said receptacle and shallower at the other ends.

7. The combination with a stoper having cam surfaces forming wings on the top thereof and an annular recess in the bottom, a packing ring to fit in said annular recess and a bail having in-turned ends, of a receptacle having recesses perpendicular to the direction of pull of said bail for the reception of said ends, said recesses being deepest at the ends adjacent to the orifice of said receptacle and shallower at the other ends.

In testimony whereof I have signed my name to this specification in the presence of two subscribing witnesses.

HENRY MARLES.

Witnesses:
HERBERT D. JAMESON,
R. W. WILLIAMS.